United States Patent
Marking

(10) Patent No.: US 9,784,333 B2
(45) Date of Patent: Oct. 10, 2017

(54) COMPRESSION ISOLATOR FOR A SUSPENSION DAMPER

(71) Applicant: Fox Factory, Inc., Scotts Valley, CA (US)

(72) Inventor: John Marking, El Cajon, CA (US)

(73) Assignee: Fox Factory, Inc., Scotts Valley, CA (US)

( * ) Notice: Subject to any disclaimer, the term of this patent is extended or adjusted under 35 U.S.C. 154(b) by 0 days.

(21) Appl. No.: 15/180,250

(22) Filed: Jun. 13, 2016

(65) Prior Publication Data

US 2016/0290431 A1    Oct. 6, 2016

Related U.S. Application Data

(63) Continuation of application No. 14/692,401, filed on Apr. 21, 2015, now Pat. No. 9,366,307, which is a continuation of application No. 13/226,230, filed on Sep. 6, 2011, now Pat. No. 9,038,791, and a continuation-in-part of application No. 13/175,244, filed on Jul. 1, 2011, now Pat. No. 8,627,932, said
(Continued)

(51) Int. Cl.
| | |
|---|---|
| *F16F 9/512* | (2006.01) |
| *B60G 13/08* | (2006.01) |
| *F16F 9/346* | (2006.01) |
| *F16F 9/06* | (2006.01) |
| *F16F 9/48* | (2006.01) |
| *F16F 9/32* | (2006.01) |
| *F16F 9/34* | (2006.01) |

(52) U.S. Cl.
CPC .............. *F16F 9/512* (2013.01); *B60G 13/08* (2013.01); *F16F 9/065* (2013.01); *F16F 9/3235* (2013.01); *F16F 9/3405* (2013.01); *F16F 9/346* (2013.01); *F16F 9/48* (2013.01); *B60G 2202/24* (2013.01)

(58) Field of Classification Search
CPC ...... F16F 9/504; F16F 9/34; F16F 9/43; F16F 9/185; B60G 17/08
See application file for complete search history.

(56) References Cited

U.S. PATENT DOCUMENTS

| | | |
|---|---|---|
| 1,492,731 A | 5/1924 | Kerr |
| 1,575,973 A | 3/1926 | Coleman |
| (Continued) | | |

FOREIGN PATENT DOCUMENTS

| | | |
|---|---|---|
| DE | 3709447 A1 | 10/1988 |
| DE | 3738048 A1 | 5/1989 |
| (Continued) | | |

OTHER PUBLICATIONS

Electronic Translation of DE3709447A1.
(Continued)

*Primary Examiner* — Vishal Sahni

(57) ABSTRACT

A method and apparatus for a damper. The damper comprises a fluid chamber having a piston dividing the chamber into a compression and rebound sides, a reservoir in fluid communication with the compression side of the chamber, and an isolator disposed between the compression side and the reservoir, whereby the isolator obstructs fluid flow between the compression side and the reservoir. In one embodiment, a bypass provides a fluid path between the compression side and the isolator.

3 Claims, 4 Drawing Sheets

Related U.S. Application Data application No. 13/226,230 is a continuation-in-part of application No. 13/010,697, filed on Jan. 20, 2011, now Pat. No. 8,857,580, and a continuation-in-part of application No. 12/684,072, filed on Jan. 7, 2010, now abandoned.

(60) Provisional application No. 61/380,177, filed on Sep. 3, 2010, provisional application No. 61/361,127, filed on Jul. 2, 2010, provisional application No. 61/296,826, filed on Jan. 20, 2010, provisional application No. 61/143,152, filed on Jan. 7, 2009.

(56) References Cited

U.S. PATENT DOCUMENTS

| | | | |
|---|---|---|---|
| 2,018,312 | A | 10/1935 | Moulton |
| 2,492,331 | A | 12/1949 | Spring |
| 2,725,076 | A | 11/1955 | Hansen et al. |
| 2,838,140 | A | 6/1958 | Rasmusson et al. |
| 2,897,613 | A | 8/1959 | Davidson et al. |
| 2,941,629 | A | 6/1960 | Etienne et al. |
| 2,991,804 | A | 7/1961 | Merkle |
| 3,202,413 | A | 8/1965 | Colmerauer |
| 3,286,797 | A | 11/1966 | Leibfritz et al. |
| 3,420,493 | A | 1/1969 | Kraft et al. |
| 3,556,137 | A | 1/1971 | Billeter et al. |
| 3,584,331 | A | 6/1971 | Richard et al. |
| 3,605,960 | A | 9/1971 | Singer |
| 3,714,953 | A | 2/1973 | Solvang |
| 3,750,856 | A | 8/1973 | Kenworthy et al. |
| 3,791,408 | A | 2/1974 | Saitou et al. |
| 4,022,113 | A | 5/1977 | Blatt et al. |
| 4,072,087 | A | 2/1978 | Mueller et al. |
| 4,139,186 | A | 2/1979 | Postema et al. |
| 4,174,098 | A | 11/1979 | Baker et al. |
| 4,183,509 | A | 1/1980 | Nishikawa et al. |
| 4,305,566 | A | 12/1981 | Grawunde |
| 4,333,668 | A | 6/1982 | Hendrickson et al. |
| 4,334,711 | A | 6/1982 | Mazur et al. |
| 4,337,850 | A | 7/1982 | Shimokura et al. |
| 4,491,207 | A | 1/1985 | Boonchanta et al. |
| 4,502,673 | A | 3/1985 | Clark et al. |
| 4,548,233 | A | 10/1985 | Woelfges et al. |
| 4,620,619 | A | 11/1986 | Emura et al. |
| 4,660,689 | A | 4/1987 | Hayashi et al. |
| 4,673,194 | A | 6/1987 | Sugasawa |
| 4,750,735 | A | 6/1988 | Furgerson et al. |
| 4,765,648 | A | 8/1988 | Mander et al. |
| 4,826,207 | A | 5/1989 | Yoshioka et al. |
| 4,846,317 | A | 7/1989 | Hudgens |
| 4,919,166 | A | 4/1990 | Sims et al. |
| 4,936,424 | A | 6/1990 | Costa |
| 4,949,989 | A | 8/1990 | Kakizaki et al. |
| 4,975,849 | A | 12/1990 | Ema et al. |
| 5,161,653 | A | 11/1992 | Hare |
| 5,163,742 | A | 11/1992 | Topfer et al. |
| 5,178,242 | A | 1/1993 | Nakamura et al. |
| 5,203,584 | A | 4/1993 | Butsuen et al. |
| 5,207,774 | A | 5/1993 | Wolfe et al. |
| 5,230,364 | A | 7/1993 | Leng et al. |
| 5,259,487 | A * | 11/1993 | Petek ................ F16F 9/532 188/267.1 |
| 5,277,283 | A | 1/1994 | Yamaoka et al. |
| 5,293,971 | A | 3/1994 | Kanari |
| 5,307,907 | A | 5/1994 | Nakamura et al. |
| 5,318,066 | A | 6/1994 | Burgorf et al. |
| 5,398,787 | A | 3/1995 | Woessner et al. |
| 5,413,196 | A | 5/1995 | Forster |
| 5,588,510 | A | 12/1996 | Wilke |
| 5,597,180 | A | 1/1997 | Ganzel et al. |
| 5,598,337 | A | 1/1997 | Butsuen et al. |
| 5,651,433 | A | 7/1997 | Wirth et al. |
| 5,657,840 | A | 8/1997 | Lizell |
| 5,699,885 | A | 12/1997 | Forster |
| 5,810,128 | A | 9/1998 | Eriksson et al. |
| 5,813,731 | A | 9/1998 | Newman et al. |
| 5,884,921 | A | 3/1999 | Katsuda et al. |
| 5,937,975 | A | 8/1999 | Forster et al. |
| 5,992,450 | A | 11/1999 | Parker et al. |
| 5,996,746 | A | 12/1999 | Turner et al. |
| 6,035,979 | A | 3/2000 | Foerster |
| 6,058,340 | A | 5/2000 | Uchiyama et al. |
| 6,067,490 | A | 5/2000 | Ichimaru et al. |
| 6,092,011 | A | 7/2000 | Hiramoto et al. |
| 6,213,263 | B1 | 4/2001 | De Frenne |
| 6,254,067 | B1 | 7/2001 | Yih |
| 6,293,530 | B1 | 9/2001 | Delorenzis et al. |
| 6,296,092 | B1 * | 10/2001 | Marking ............... F16F 9/0209 188/315 |
| 6,318,525 | B1 | 11/2001 | Vignocchi et al. |
| 6,371,262 | B1 | 4/2002 | Katou et al. |
| 6,415,895 | B2 | 7/2002 | Marking et al. |
| 6,427,812 | B2 | 8/2002 | Crawley et al. |
| 6,474,454 | B2 | 11/2002 | Matsumoto et al. |
| 6,474,753 | B1 | 11/2002 | Rieth et al. |
| 6,592,136 | B2 | 7/2003 | Becker et al. |
| 6,619,615 | B1 | 9/2003 | Mayr et al. |
| 6,648,109 | B2 | 11/2003 | Farr et al. |
| 6,966,412 | B2 | 11/2005 | Braswell et al. |
| 6,978,871 | B2 | 12/2005 | Holiviers |
| 6,991,076 | B2 | 1/2006 | McAndrews |
| 7,128,192 | B2 | 10/2006 | Fox |
| 7,234,680 | B2 | 6/2007 | Hull et al. |
| 7,270,221 | B2 | 9/2007 | McAndrews |
| 7,299,112 | B2 | 11/2007 | LaPlante et al. |
| 7,325,660 | B2 | 2/2008 | Norgaard et al. |
| 7,591,352 | B2 | 9/2009 | Hanawa |
| 7,628,259 | B2 | 12/2009 | Norgaard et al. |
| 7,654,369 | B2 | 2/2010 | Murray et al. |
| 7,722,069 | B2 | 5/2010 | Shirai |
| 7,730,906 | B2 | 6/2010 | Kleinert et al. |
| 7,779,974 | B2 | 8/2010 | Timoney et al. |
| 7,946,163 | B2 | 5/2011 | Gartner |
| 8,210,330 | B2 | 7/2012 | Vandewal |
| 8,256,587 | B2 | 9/2012 | Bakke et al. |
| 8,262,062 | B2 | 9/2012 | Kamo et al. |
| 8,291,889 | B2 | 10/2012 | Shafer et al. |
| 8,307,965 | B2 | 11/2012 | Föster et al. |
| 8,556,048 | B2 | 10/2013 | Maeda et al. |
| 8,627,932 | B2 | 1/2014 | Marking |
| 8,770,357 | B2 | 7/2014 | Sims et al. |
| 8,857,580 | B2 | 10/2014 | Marking |
| 9,033,122 | B2 | 5/2015 | Ericksen et al. |
| 9,038,791 | B2 | 5/2015 | Marking |
| 9,120,362 | B2 | 9/2015 | Marking |
| 9,194,456 | B2 | 11/2015 | Laird et al. |
| 9,239,090 | B2 | 1/2016 | Marking et al. |
| 9,366,307 | B2 | 6/2016 | Marking |
| 9,452,654 | B2 | 9/2016 | Ericksen |
| 9,616,728 | B2 | 4/2017 | Marking |
| 9,663,181 | B2 | 5/2017 | Ericksen et al. |
| 2001/0017334 | A1 | 8/2001 | Vincent |
| 2002/0000352 | A1 | 1/2002 | Matsumoto et al. |
| 2002/0121416 | A1 | 9/2002 | Katayama et al. |
| 2003/0001346 | A1 | 1/2003 | Hamilton et al. |
| 2003/0160369 | A1 | 8/2003 | LaPlante et al. |
| 2004/0099312 | A1 | 5/2004 | Boyer et al. |
| 2004/0222056 | A1 | 11/2004 | Fox |
| 2005/0077131 | A1 | 4/2005 | Russell |
| 2005/0098401 | A1 | 5/2005 | Hamilton et al. |
| 2005/0110229 | A1 | 5/2005 | Kimura et al. |
| 2006/0065496 | A1 | 3/2006 | Fox et al. |
| 2006/0081431 | A1 | 4/2006 | Breese et al. |
| 2006/0113834 | A1 | 6/2006 | Hanawa |
| 2006/0124414 | A1 | 6/2006 | Hanawa |
| 2006/0237272 | A1 | 10/2006 | Huang |
| 2006/0289258 | A1 * | 12/2006 | Fox .................. F16F 9/44 188/322.21 |
| 2007/0008096 | A1 | 1/2007 | Tracy |
| 2007/0039790 | A1 | 2/2007 | Timoney et al. |
| 2007/0051573 | A1 | 3/2007 | Norgaard et al. |
| 2007/0088475 | A1 | 4/2007 | Nordgren et al. |
| 2008/0006494 | A1 | 1/2008 | Vandewal |

(56) References Cited

U.S. PATENT DOCUMENTS

| | | |
|---|---|---|
| 2008/0029730 A1 | 2/2008 | Kamo et al. |
| 2008/0059025 A1 | 3/2008 | Furuichi et al. |
| 2008/0093820 A1 | 4/2008 | McAndrews |
| 2008/0185244 A1 | 8/2008 | Maeda et al. |
| 2008/0250844 A1 | 10/2008 | Gartner |
| 2009/0001684 A1 | 1/2009 | McAndrews et al. |
| 2009/0020382 A1 | 1/2009 | Van Weelden et al. |
| 2009/0277736 A1 | 11/2009 | McAndrews et al. |
| 2009/0288924 A1 | 11/2009 | Murray et al. |
| 2009/0302558 A1 | 12/2009 | Shirai |
| 2010/0010709 A1 | 1/2010 | Song |
| 2010/0059964 A1 | 3/2010 | Morris |
| 2010/0109277 A1* | 5/2010 | Furrer .................... B60G 17/08 280/124.161 |
| 2010/0170760 A1 | 7/2010 | Marking |
| 2010/0276238 A1 | 11/2010 | Crasset |
| 2011/0127706 A1 | 6/2011 | Sims et al. |
| 2011/0174582 A1 | 7/2011 | Wootten et al. |
| 2011/0214956 A1 | 9/2011 | Marking |
| 2011/0284333 A1 | 11/2011 | Krog et al. |
| 2012/0018263 A1 | 1/2012 | Marking |
| 2012/0018264 A1 | 1/2012 | King |
| 2012/0048665 A1 | 3/2012 | Marking |
| 2012/0181126 A1 | 7/2012 | De Kock |
| 2012/0222927 A1 | 9/2012 | Marking |
| 2012/0253599 A1 | 10/2012 | Shirai |
| 2012/0305350 A1 | 12/2012 | Ericksen et al. |
| 2013/0001030 A1 | 1/2013 | Goldasz et al. |
| 2013/0292218 A1 | 11/2013 | Ericksen et al. |
| 2014/0008160 A1 | 1/2014 | Marking et al. |
| 2014/0027219 A1 | 1/2014 | Marking et al. |
| 2015/0081171 A1 | 3/2015 | Ericksen et al. |
| 2017/0008363 A1 | 1/2017 | Ericksen et al. |
| 2017/0184174 A1 | 6/2017 | Marking |

FOREIGN PATENT DOCUMENTS

| | | |
|---|---|---|
| DE | 3924166 C1 | 2/1991 |
| DE | 4029090 A1 | 3/1992 |
| DE | 4406918 A1 | 9/1994 |
| EP | 207409 A2 | 1/1987 |
| EP | 1241087 A1 | 9/2002 |
| EP | 1623856 A2 | 2/2006 |
| EP | 2248691 A1 | 11/2010 |
| EP | 2357098 A2 | 8/2011 |
| EP | 2410203 A2 | 1/2012 |
| EP | 2848582 A1 | 3/2015 |
| GB | 2289111 A | 11/1995 |
| JP | 01106721 A | 4/1989 |
| JP | 04203540 A | 7/1992 |
| JP | 05149364 A | 6/1993 |
| JP | 2007302211 A | 11/2007 |
| KR | 20070076226 A | 7/2007 |

OTHER PUBLICATIONS

English language abstract for EP 0207409 (no date).
EP Search Report for European Application No. 15163428.4, Jul. 3, 2017, 7 Pages.

\* cited by examiner

COMPRESSION ISOLATOR FOR A SUSPENSION DAMPER

CROSS-REFERENCE TO RELATED APPLICATIONS

This application is a continuation application of and claims the benefit of and claims priority to U.S. patent application Ser. No. 14/692,401, filed on Apr. 21, 2015, entitled "COMPRESSION ISOLATOR FOR A SUSPENSION DAMPER" by John Marking, assigned to the assignee of the present application, and is hereby incorporated by reference in its entirety.

The U.S. patent application Ser. No. 14/692,401 is a continuation application of and claims the benefit of and claims priority to U.S. patent application Ser. No. 13/226,230, filed on Sep. 6, 2011, entitled "COMPRESSION ISOLATOR FOR A SUSPENSION DAMPER" by John Marking, assigned to the assignee of the present application, and is hereby incorporated by reference in its entirety.

The U.S. patent application Ser. No. 13/226,230 claims the benefit of and claims priority to the U.S. Provisional Patent Application No. 61/380,177 filed on Sep. 3, 2010, entitled "COMPRESSION ISOLATOR FOR A SUSPENSION DAMPER" by John Marking, assigned to the assignee of the present application, and is hereby incorporated by reference in its entirety.

The U.S. patent application Ser. No. 13/226,230 is also a continuation-in-part application of and claims the benefit of and claims priority to U.S. patent application Ser. No. 13/175,244, filed on Jul. 1, 2011, now U.S. Pat. No. 8,627,932, entitled "BYPASS FOR A SUSPENSION DAMPER" by John Marking, assigned to the assignee of the present application, and is hereby incorporated by reference in its entirety.

The U.S. Pat. No. 8,627,932 claims the benefit of and claims priority to the U.S. Provisional Patent Application No. 61/361,127 filed on Jul. 2, 2010, entitled "BYPASS LOCK-OUT VALVE FOR A SUSPENSION DAMPER" by John Marking, assigned to the assignee of the present application, and is hereby incorporated by reference in its entirety.

The U.S. patent application Ser. No. 13/226,230 is also a continuation-in-part application of and claims the benefit of and claims priority to U.S. patent application Ser. No. 13/010,697, filed on Jan. 20, 2011, now U.S. Pat. No. 8,857,580 entitled "REMOTELY OPERATED BYPASS FOR A SUSPENSION DAMPER" by John Marking, assigned to the assignee of the present application, and is hereby incorporated by reference in its entirety.

The U.S. Pat. No. 8,857,580 claims the benefit of and claims priority to the U.S. Provisional Patent Application No. 61/296,826 filed on Jan. 20, 2010, entitled "BYPASS LOCK-OUT VALVE FOR A SUSPENSION DAMPER" by John Marking, assigned to the assignee of the present application, and is hereby incorporated by reference in its entirety.

The U.S. patent application Ser. No. 13/226,230 is also a continuation-in-part application of and claims the benefit of and claims priority to U.S. patent application Ser. No. 12/684,072, filed on Jan. 7, 2010, now abandoned, entitled "REMOTELY OPERATED BYPASS FOR A SUSPENSION DAMPER" by John Marking, assigned to the assignee of the present application, and is hereby incorporated by reference in its entirety.

The U.S. patent application Ser. No. 12/684,072 claims the benefit of and claims priority to the U.S. Provisional Patent Application No. 61/143,152 filed on Jan. 7, 2009, now expired, entitled "REMOTE BYPASS LOCK-OUT" by John Marking, assigned to the assignee of the present application, and is hereby incorporated by reference in its entirety.

BACKGROUND OF THE INVENTION

Field of the Invention

Embodiments of the present invention generally relate to a suspension damper assembly for a vehicle. More specifically, the invention relates to a compression isolator for use with a vehicle damper.

Description of Related Art

Vehicle suspension systems typically include a spring component or components and a dampening component or components. Typically, mechanical springs, like helical springs are used with some type of viscous fluid-based dampening mechanism and the two are mounted functionally in parallel.

SUMMARY OF THE INVENTION

Embodiments herein generally comprise a fluid chamber having a piston dividing the chamber into a compression and rebound sides, a reservoir in fluid communication with the compression side of the chamber, and an isolator disposed in a fluid flow path between the compression side and the reservoir, whereby the isolator obstructs fluid flow between the compression side and the reservoir. In one embodiment, a bypass provides a fluid path between the compression side and the isolator.

BRIEF DESCRIPTION OF THE DRAWINGS

So that the manner in which the above recited features can be understood in detail, a more particular description may be had by reference to embodiments, some of which are illustrated in the appended drawings. It is to be noted, however, that the appended drawings illustrate only typical embodiments and are therefore not to be considered limiting of its scope, for the invention may admit to other equally effective embodiments.

DESCRIPTION OF EMBODIMENTS

Figure 1:
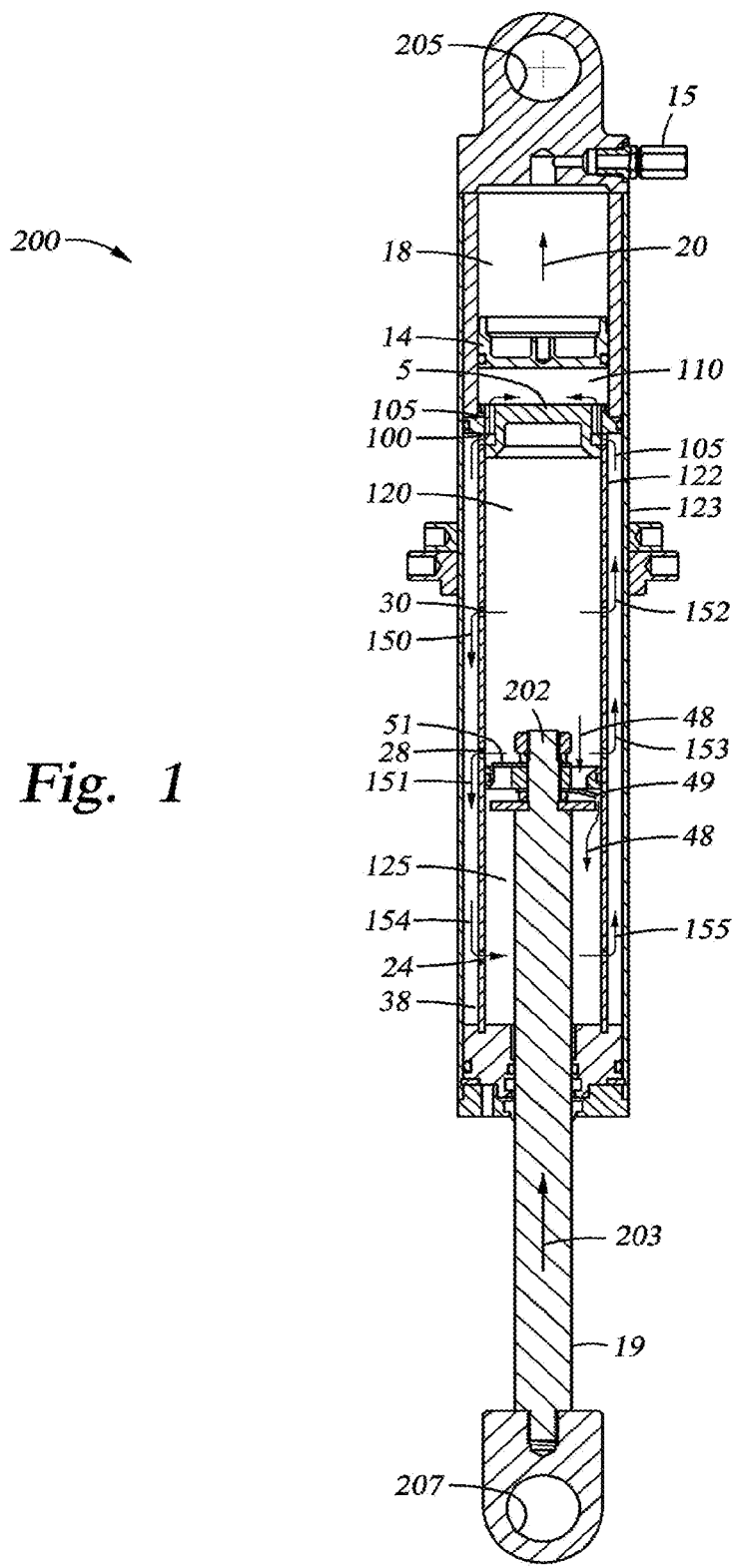
FIG. 1 is a section view of a damper with a piston in a first position within a chamber.

FIG. 1 is a section view of a damper 200 that is typically used in a vehicle suspension in order to control excessive movement of a spring (not shown). The damper 200 includes a fluid-filled chamber 122 having a piston 202 and rod 19 for reciprocation therein as the damper operates. At each end, the damper 200 is provided with mounting eyes 205, 207 for mounting to different parts of the vehicle. The piston 202 is equipped with shims 49, 51 that meter fluid through the piston 202 as it moves in a compression or rebound stroke in the cylinder. For example, in FIG. 1 the piston 202 is shown in a compression stroke as noted by rod 19 movement directional arrow 203. As it moves towards a far end (e.g. 205) of the cylinder, fluid travels from a compression side 120 to a rebound side 125 via shim 49 along a path 48. In a rebound stroke (not shown) shim 51 is utilized to meter fluid in an opposite direction through the piston 202.

In addition to the shimmed paths 49, 51 through the piston 202, fluid can travel between the compression 120 and rebound 125 sides of the chamber by utilizing an annular bypass 38 formed between the chamber 122 and an outer housing 123. While the bypass 38 utilizes an annular area and is co-axially disposed around the chamber 122 in the embodiment shown, it could comprise any number of designs so long as it provides an alternative fluid path between compression and rebound sides and around the piston 202. An internal bypass damper is shown and described in U.S. Pat. No. 6,296,092 which is entirely incorporated herein by reference. From the compression side 120 of the chamber, fluid may, in one embodiment, enter the bypass 38 through one of two ports 28, 30. On the rebound side, communication between the chamber and the bypass 38 is through port 24. The bypass 38 is a convenient way to provide "position sensitive" dampening. For example, on the compression side 120 of the chamber, the ports 28, 30 are axially spaced along the wall of the chamber. During a first portion of a compression stroke (shown in FIG. 1), both ports 28, 30 are open and a relatively large volume of fluid in the compression side 120 is free to utilize the bypass 38 to avoid the dampening effects of the piston shim 49. During a second portion of a compression stroke port 28 is closed by passage of the piston 202 and bypass fluid becomes limited to port 30 which results in increased compression damping.

At an end opposite the rod 19, the damper 200 includes a reservoir 110 for collecting fluid as the fluid capacity of the chamber decreases due to the volume of the encroaching piston rod 19 during a compression stroke. The reservoir 110 includes a floating piston 14 that acts to transfer pressure between damping fluid on one side and a gas pocket 18 on another side. As fluid enters the reservoir 110, the floating piston 14 moves (arrow 20) to compress the gas pocket and enlarge the volume of the reservoir 110 thereby compensating for the volume of the rod 19. In a rebound stroke of the piston 202, the reservoir returns fluid to the chamber 122 by operating in a reverse fashion (e.g. the pressurized gas pocket expands and damping fluid leaves the reservoir). A fill valve 15 permits access to the gas pocket, permitting the pressure in the pocket 18 to be adjusted based upon various conditions and preferences.

FIG. 1 also shows an embodiment of a compression isolator assembly 5. The isolator is constructed and arranged to prevent fluid from rapidly acting upon floating piston 14 of the reservoir 110. Without the isolator 5 a rapid or direct action of the compression damping fluid on the floating piston 14 can cause cavitation wherein a vacuum is created on the rebound side 125 of the chamber and the gas in the gas pocket essentially collapses, causing the damper to cease functioning properly. Cavitation is inhibited by the isolator 5 and an aperture 100 formed in the isolator 5 that adds additional dampening between the compression side and the reservoir in the event of a rapid movement of damping fluid towards the reservoir. Under normal circumstances, the isolator 5 does not create a noticeable effect on the dampening action of the damper. Rather, it is designed to operate only in high velocity compression events, such as a sudden terrain feature like a square edge bump, to prevent rapid compression from suddenly collapsing the nitrogen gas (or other compressible material) in pocket 18 due to a rapidly moving floating piston 14.

In one embodiment, the compression isolator 5 seals a far end of the chamber 122 between the compression side 120 and the floating piston 14 of the reservoir 110, and fluid communication between the chamber and the reservoir is limited to a fluid path 105 through aperture 100. As shaft 19 moves in a compression stroke, damping fluid from the compression side 120 is compressed against compression isolator 5 and thereby forced back through piston assembly shim 49 (along flow path 48) to rebound chamber 125. During such compression, additional fluid travels from chamber 120 to chamber 125 by exiting aperture 28 or 30, traveling in annular space 38 (along paths 150, 151) and entering chamber 125 via aperture 24 (along path 154). At the same time, fluid in chamber 125, that corresponds to the incurring volume of shaft 19, is displaced from chamber 125 and exits via aperture 24 (along path 155) into annular space 38 toward reservoir 110.

Figure 2:
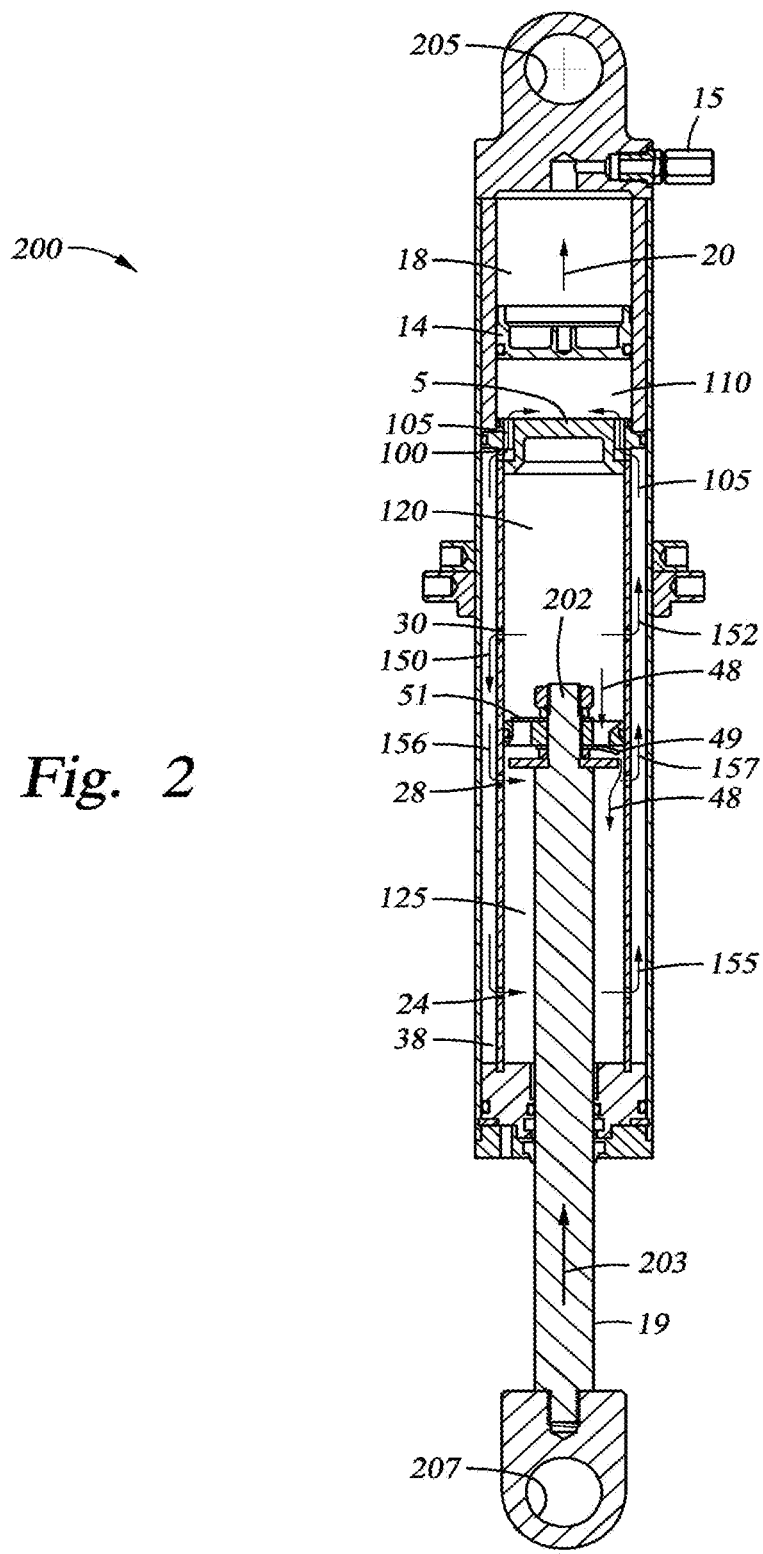
FIG. 2 is a section view of the damper of FIG. 1, with the piston in a second position.
Figure 3:
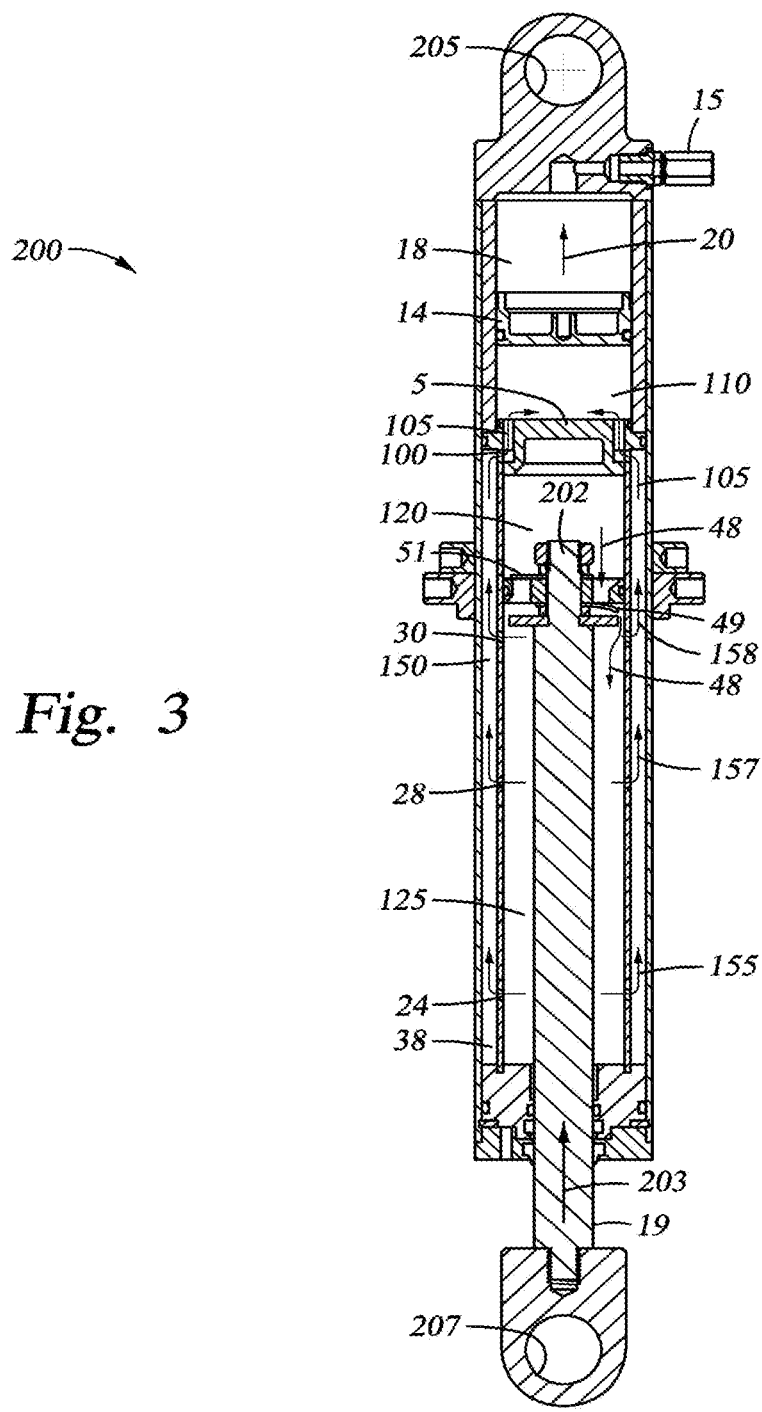
FIG. 3 is a section view of the damper of FIG. 1, with the piston in a third position.

FIGS. 1, 2 and 3 illustrate operation of the damper components at various stages in a compression stroke of the piston. In each stage, fluid utilizes a path 48 through piston shim 49. In FIG. 1, the piston is at an early stage in the stroke and both ports 28, 30 are exposed to the compression side 120 of the chamber and, as illustrated by directional arrows 150, 151 fluid is flowing to the rebound chamber utilizing bypass 38 with fluid entering port 24 shown by arrow 154. Also shown with directional arrows 152, 153, 155 is fluid flow from the compression side (152, 153) to the reservoir and from the rebound side (155) to the reservoir. The various (and sometimes opposing) arrows are simply used to illustrate the possible flow of the fluid in a dynamic system where flow direction is dependent upon a number of factors including the position of the piston in the chamber, the design of shim 49 in the piston 202, the sizes of the ports, and the characteristics of aperture 100 formed in the isolator 5.

As the piston 202 continues its movement towards the end of the chamber (as shown in FIG. 2) the piston passes port 28, effectively reducing by half the volume of fluid that can exit the compression side 120 into the bypass 38 and requiring that volume of fluid to pass through piston shim 49, along path 48. As shown in the Figure, port 28 is now open to the rebound side 125 of the chamber permitting fluid flow from the bypass to the rebound side 125 (along 156) and also permitting fluid to exit the rebound side 125 (along arrow 157) in the direction of the reservoir 110.

Finally, as shown in FIG. 3, the piston 202 has passed both ports 28 and 30 and the bypass is effectively closed to the entry of fluid from the compression side 120 of the chamber 122. Instead, all ports, 24, 28, and 30 serve to carry fluid from the rebound side 125 of the chamber to the reservoir 110 as is necessitated by the volume of the encroaching rod 19. Flow paths from each port towards the reservoir are shown with arrows 155, 157 and 158. Because the bypass is closed, dampening is increased as the piston moves closer to a "bottom-out" position at a far end of the chamber and fluid is increasingly forced through shim 49. FIGS. 1-3 illustrate an embodiment with a bypass 38 to provide position-sensitive damping along with cavitation protection provided by the compression isolator 5.

Figure 4:
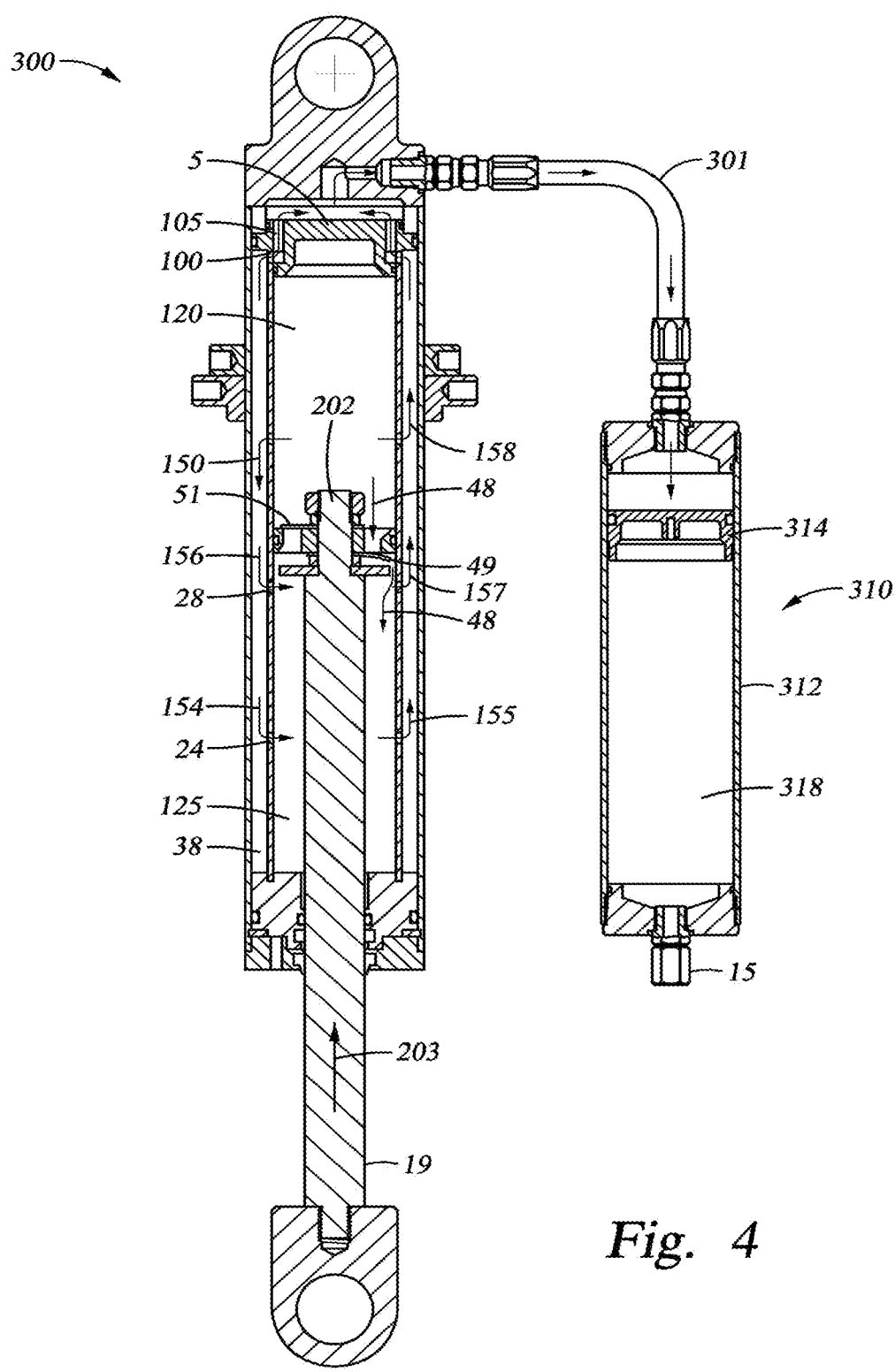
FIG. 4 is a section view of an alternative embodiment of a damper.

FIG. 4 is a section view of a damper 300 having a remote reservoir or "piggyback" 310. Like the embodiment of FIGS. 1-3, the damper includes an isolator 5 and an annular bypass 38 and includes axially disposed ports 24, 28, and 30 that permit varying amounts of fluid bypass depending upon the position of the piston 202 in the chamber 122. The primary difference in the embodiment of FIG. 4 is that the reservoir 310, floating piston 314 and gas pocket 318 are housed in a separate chamber 312 that is connected to the main damper with a fluid hose 301. In the damper of FIG. 4, the piston is shown partway through a compression stroke (as in FIG. 2) with aperture 28 on the rebound side of the piston and the various flow directions illustrated with arrows as in the previous figures. Specifically, fluid is exiting the compression side via port 30 and potentially migrating to both the rebound side (path 150) and to the reservoir (path 158). Concurrently, fluid is leaving the rebound side and traveling towards the reservoir along paths 155 and 157.

In one embodiment a simplified non-bypass type damper includes a compression isolator 5. In such embodiment (not shown) fluid travels, during a compression stroke, from the compression side of the piston to the rebound side of the piston only via flow such as along 48 through the piston. Fluid displaced by the incursion of rod 19 is pushed (along with pressure exerted due to compression of the compression side) toward the reservoir and floating piston. In such embodiment, the isolator 5 may have an aperture (in lieu of aperture 100 as shown in the Figures) or apertures located near or about a center of the isolator 5 and sized to allow normal damping flow but to restrict sudden large volume flow that may cause cavitation. It will be understood that the isolator can be used without a bypass by simply utilizing a metering device at an end of the chamber opposite the piston rod.

While the foregoing is directed to embodiments of the present invention, other and further embodiments of the invention may be devised without departing from the basic scope thereof, and the scope thereof. For example, the invention is shown in the embodiments as including a bypass that operates with the compression isolator. Similarly, the location and design of the reservoir is variable, as shown in the disclosed embodiments. Such variations are within the scope of the invention and the claims that follow.

What we claim is:

1. A vehicle suspension comprising:
    a fluid chamber housing, said fluid chamber housing defining a fluid chamber therein, said fluid chamber comprising:
        a compression side; and
        a rebound side;
    a piston disposed within said fluid chamber, said piston dividing said fluid chamber into said compression side and said rebound side, said piston having a first fluid pathway there through to enable fluid travel between said compression side and said rebound side;
    a compression isolator disposed within said fluid chamber housing;
    a reservoir chamber housing physically distinct from said fluid chamber housing, said reservoir chamber housing defining a reservoir chamber therein, said reservoir chamber fluidly coupled with said fluid chamber, said reservoir chamber housing comprising:
        a fluid-fillable portion, said fluid-fillable portion configured to receive fluid from said fluid chamber as a fluid capacity of said compression side of said fluid chamber decreases during a compression stroke; and
        a gas pocket;
    a floating piston disposed within said reservoir chamber, said floating piston movably sealing said fluid-fillable portion from said gas pocket, said floating piston configured to transfer pressure between fluid in said fluid-fillable portion of said fluid reservoir and said gas pocket; and
    a bypass chamber providing a second fluid pathway, alternative to said first fluid pathway, between said compression side and said rebound side, said bypass chamber being in fluid communication with said fluid chamber via a set of ports disposed in said wall of said fluid chamber,
    wherein said first fluid pathway comprises a compression pathway portion having a first shim to allow fluid to flow from said compression side to said rebound side but not vice versa,
    wherein said first fluid pathway comprises a rebound pathway portion having a second shim to allow fluid to flow from said rebound side to said compression side but not vice versa.

2. The vehicle suspension of claim 1, wherein said bypass chamber further comprises:
    an annular area coaxially disposed around said fluid chamber, said bypass chamber permitting varying amounts of fluid to bypass said first fluid pathway of said piston depending upon a position of said piston in said fluid chamber.

3. The vehicle suspension of claim 1, further comprising:
    a fluid hose having a first end and a second end, said first end of said fluid hose coupled to said reservoir chamber housing and said second end of said fluid hose coupled to said fluid chamber housing such that said fluid hose fluidically couples said reservoir chamber and said fluid chamber.

* * * * *